UNITED STATES PATENT OFFICE 2,539,451

METHOD OF PREPARING SULFURIC ACID ESTERS OF CELLULOSE

Carl J. Malm and Carlton L. Crane, Rochester, N. Y., assignors to Eastman Kodak Company, Rochester, N. Y., a corporation of New Jersey No Drawing. Application February 27, 1948, Serial No. 11,864

5 Claims. (Cl. 260—215)

This invention relates to a method of preparing sulfuric acid esters of cellulose in which ammonium sulfate is employed in the reaction mass.

Water-soluble cellulose derivatives have been of considerable interest in recent years. For instance, U. S. Patent 2,129,052 of Fordyce discloses the preparation of water-soluble cellulose acetates. Malm and Waring Patent 2,093,463 discloses phthalic compounds of cellulose which exhibit water solubility. Yackel and Kenyon Patent 2,232,990 discloses a method of preparing water-soluble cellulose derivatives by originating carboxyl groups in cellulose with $NO_2$ and then preparing the salt thereof.

It is an object of our invention to prepare water-soluble cellulose derivatives in which a sulfuric acid ester of cellulose is formed, and this material is converted to the salt thereof. Another object of our invention is to provide an improved method of making cellulose sulfate. A further object of our invention is to provide a method of making sulfuric acid esters of cellulose in which a uniform product is obtained. A still further object of our invention is to provide a method of making sulfuric acid esters of cellulose in which ammonium sulfate is employed in the reaction mass. A still further object is to provide a method of making cellulose derivatives which are useful as wetting agents, thickening agents or the like. Other objects of our invention will appear herein.

We have found that when cellulose is treated with a mixture of alcohol and sulfuric acid in certain proportions in the presence of ammonium sulfate that a cellulose sulfate is formed having a uniform character and without any appreciable content of hardened particles therein. We have also found that by the use of an inert diluent the reaction goes well without the necessity of using as great a proportion of the alcohol-sulfuric acid mixture as would be necessary otherwise.

In its broadest aspects our invention comprises the treatment of cellulose with a mixture of an alcohol of 3-5 carbon atoms and sulfuric acid, which mixture also contains a minor proportion of ammonium sulfate for a sufficient time to produce a product having the desired solubility in water. The preparation of cellulose sulfate in accordance with our invention is carried out by first mixing the sulfuric acid and alcohol at a temperature within the range of 25–60° F. Ammonium sulfate and preferably diluent is then mixed therewith. The proportion of sulfuric acid which is employed is less than will cause any appreciable dissolving of the cellulose sulfate in the reaction mass but is at least sufficient to promote the reaction. When too great a proportion of sulfuric acid is employed, dissolving of the cellulose occurs and the yield is appreciably reduced. If too little sulfuric acid is used, the reaction is not promoted and degradation of the cellulose occurs before appreciable radicals are introduced into the cellulose. After the reaction mixture has been prepared, cellulose is added thereto, preferably over a short period while maintaining the temperature of the mass between 25 and 60° F. The reaction is run for a sufficient time to give a product having the desired solubility in water. For instance, using a time of 45–90 minutes a product may be obtained which is soluble in water at 5–10% concentration. Shorter reaction times give products having less solubility in water and vice versa. In preparing cellulose sulfates in accordance with our invention it is preferable to first activate the cellulose by treating with water and then dehydrating with an organic solvent, such as isopropyl alcohol or some other alcohol. If desired, the dehydration may occur with ethylene chloride, and the water may be separated from the ethylene chloride by an azeotropic separation.

The mixture of alcohol and sulfuric acid prepared varies in proportions depending upon the alcohol which is used. For instance, if isopropyl alcohol is employed, the mixture should be 85–75% of sulfuric acid (95% strength) and 15–25% of alcohol. These proportions also hold true with normal propyl alcohol. When butyl alcohol is employed, the proportion of sulfuric acid which will not cause any appreciable dissolving of the cellulose sulfate but which will be at least sufficient to promote the reaction is within the range of 65–75% concentrated sulfuric acid, the remainder being alcohol. This holds true either for the normal butyl or isobutyl alcohol. With the alcohols of 5 carbon atoms, such as isoamyl or normal amyl alcohol the concentrated sulfuric acid should constitute 55–65% of the mixture, the remainder being alcohol in order that the sulfuric acid will not cause any appreciable dissolving of the cellulose sulfate but yet sufficient sulfuric acid is present to promote the sulfating reaction.

Ammonium sulfate is soluble up to about 8% of its weight in the alcohol-sulfuric acid mixture at 50° F. Therefore, not more than 8% of ammonium sulfate will ordinarily be used although more can be employed if desired, such as up to 15, 20, or even 25% without interfering with the reaction. Any ammonium sulfate employed improves the reaction and the lower limit of ammonium sulfate used may be as little as .1% of the alcohol-sulfuric acid mixture. For best results, however, it is preferred to use at least ½% of ammonium sulfate to assure the obtaining of a product free of particles which cannot be satisfactorily neutralized. When the reaction is carried out without the use of ammonium sulfate, a considerable proportion of hardened particles is obtained.

The preparation of cellulose sulfate can be carried out using alcohol, sulfuric acid, and ammonium sulfate as the complete reaction mixture. However, in the interests of economy, it is desirable to employ an inert diluent to replace a part of the alcohol-sulfuric acid mixture. Various inert diluents may be employed, such as petroleum distillates, such as Stoddard solvent, or kerosene, aromatic hydrocarbons, such as toluene or benzene or chlorinated hydrocarbons, such as ethylene chloride or methylene chloride. The proportion of diluent employed is usually equal to that of the alcohol-sulfuric acid mixture although variation of this proportion is within the scope of our invention. As regards the proportion of the alcohol-sulfuric acid mixture to cellulose, the use of at least 12 parts of this mixture to 1 part of cellulose is preferred for commercial acetylation-grade cellulose. However, quantities as low as 4 to 1 can be used especially when accompanied by good mixing and with a diluent to add to the proportion of liquid present. There is no advantage in using a proportion of alcohol-sulfuric acid mixture to cellulose of greater than 12 to 1 but the process is operative with greater proportions such as up to 30 to 1 or even more. It is, however, much more economical to limit this proportion and use diluents therewith. Ordinarily, a liquid-to-cellulose ratio of 30 to 1 is satisfactory. However, for the preparation of higher viscosity products, it is preferable to use higher liquid-to-cellulose ratios, such as 40 to 1 or even 50–60 to 1. When a diluent is employed, ordinarily a heterogeneous reaction mixture is obtained. However, the reaction is carried out with vigorous stirring and the diluent and the alcohol-sulfuric acid mixture are intimately associated during the course of the reaction.

The cellulose which is employed may be any reactive form of cellulose, such as chemical wood pulp or cotton linters. Ordinarily, acetylation grade cellulose would be employed as the starting material. The reaction can be facilitated by saturating the cellulose with water and then removing the water, removal of the last portions thereof being by means of some organic solvent, such as isopropyl alcohol or other alcohol. A convenient method of dehydration is to suck the organic liquid through the wet cellulose while in sheet or mat form. If alcohol is employed in the cellulose activation and the cellulose employed is wet with the alcohol, the proportions of alcohol and sulfuric acid in the reaction mixture must be so adjusted as to take into account this additional alcohol which is supplied along with the cellulose. If ethylene chloride is employed to dehydrate the cellulose and the activated cellulose is wet with ethylene chloride, this liquid may be taken into account in calculating the total amount of diluent which is present. It may be desirable at times to use cellulose as a starting material which has been cooled prior to its addition to the reaction mass, such as to a temperature of 0–30° F. In the alcohol-sulfuric acid mixture a mixture of alcohols may be employed if desired. For instance, ethyl alcohol may be incorporated up to 50% in the alcohol which is used although it is desirable to keep the proportion of ethyl alcohol to a minimum figure. If a mixture of isopropyl alcohol and butyl alcohol, for instance, is used, the alcohol-sulfuric acid proportion to be employed would depend upon the relative proportions of each alcohol which is present. This proportion can easily be extrapolated from the proportions given for the individual alcohols. This also holds true with a mixture of a propyl and an amyl alcohol or a butyl and an amyl alcohol.

The reaction between the cellulose and the sulfating mixture may be carried out in any type of mixing apparatus providing for adequate heat transfer. For instance, the reaction proceeds satisfactorily in a turbo mixer. However, other types of agitators may be employed, such as propeller stirrers or Sigma Blade stirrers providing the vessels are so adapted that good heat transfer takes place.

The process of making cellulose sulfate may be carried out, for instance, by adding to a turbo mixer made of corrosion resistant metal, such as stainless steel, concentrated sulfuric acid, and isopropyl alcohol to form a mixture having 22% of isopropyl alcohol, 75% of sulfuric acid and 3% water, the mixing being carried out at 25–60° F. After thorough mixing a small proportion of ammonium sulfate, such as 1¼% based on the alcohol-sulfuric acid mixture, is added and also the desired proportion of diluent. Cellulose is then added, preferably over a period of 5 to 10 minutes, and the temperature is maintained between 25 and 60° F. If a product is desired being soluble in water at a 5 to 10% concentration the time of running will be preferably between 45 and 90 minutes, the time for running the reaction depending upon the temperature used. If a product is desired which is only soluble in water at a 1% concentration, a much less time of reaction may be employed. After the product is formed, the mass may be centrifuged and the liquid obtained allowed to stand to separate the diluent from the alcohol and acid, or the mass may be allowed to stand and the diluent which forms as a separate layer may be withdrawn whereupon the mass is led to a centrifuge and the product is obtained by centrifuging off the liquid. The alcohol-sulfuric acid mixture thus obtained can be fortified and reused in a subsequent process in accordance with our invention. The cellulose sulfate which is obtained in the centrifuge is neutralized with a base of an alkali-metal salt of a weak acid. For instance, it is desirable to neutralize the cellulose sulfate with a dilute solution of sodium acetate in a solvent in which the cellulose sulfate is insoluble. Instead of sodium acetate, sodium carbonate or sodium hydroxide might be employed to prepare the sodium salt of cellulose sulfate. Obviously, other alkali metal salts of cellulose sulfate may be prepared such as by using the corresponding potassium compounds or the ammonium or the amine salts may be prepared by using the proper neutralizing agents.

The following examples illustrate our invention:

*Example 1.*—Wood pulp was activated with a one hour boil in distilled water. The boiled product was centrifuged and dehydrated with isopropanol to a moisture content of less than 3% based on the weight of the cellulose. 40.8 parts of toluol recovered from a previous run, 4.2 parts of new toluol, and 23.4 parts of concentrated sulfuric acid were added to a turbo mixer and cooled to 60° F. 4.4 parts of isopropanol and .37 part of ammonium sulfate were slowly added while stirring so that the temperature of the mixture was held below 60° F. When the addition of isopropanol was complete, the mixture was cooled to 40° F. 4.7 parts of the pulp consisting of 2.5 parts of pulp and 2.2 parts of isopropanol were added to the reaction mixture. In the initial five minutes of the reaction the temperature rose from 40 to 50° F., and this temperature was held for ¾ of an hour. The reaction mass was then drained from the turbo mixer into a suitable container, and the upper layer was decanted for reuse. The lower layer containing the fibrous product was transferred to a centrifuge and the excess liquid was removed by centrifuging. The wetted compressed cake was removed from the centrifuge and slurried in 65 parts of isopropanol at 20° F. Agitation was continued until the product was thoroughly dispersed. No lumps or agglomerated masses remained. The slurry was then replaced in the centrifuge, and the excess solvent and acid were centrifuged off. The slurry process was repeated twice more until the residual acid in the wash solvent was not more than 0.5% as $H_2SO_4$. The product was then transferred to a turbo mixer and slurried with 45 parts of a mixture of 10% distilled water, 90% isopropanol. A mixture of 15% sodium acetate, 35% distilled water and 50% methyl alcohol were added and thoroughly mixed until a constant pH of 7–7.5 was obtained. The slurry was then centrifuged and the product was dried at 140° F. The resulting product was found to have a sulfur content of 8.7% and a 10% distilled water viscosity of 2936 centipoises. The 10% solution in distilled water was found to be a clear viscous liquid.

*Example 2.*—Wood pulp was activated by boiling one hour in distilled water and then centrifuged and dehydrated with isopropanol to a moisture content of less than 3% based on the weight of the cellulose. 40.3 parts of recovered toluol, 4.7 parts of new toluol, and 23.4 parts of concentrated sulfuric acid were added to a turbo type mixer and cooled to 60° F. or less. A mixture of 4.9 parts of isopropanol and 1.5 parts of ammonium sulfate was then added to the mass at such a rate that the temperature of the mixture was held below 60° F., the stirring being continued. The mixture was then cooled to 29° F. and 4.2 parts activated pulp consisting of 2.5 parts of wood pulp and 1.7 parts of isopropanol (cooled to 20° F.) were added, the stirring being continued. The temperature of the reaction rose to 44° F. and then dropped back to 26° F. The reaction was continued for 45 minutes from the addition of the pulp, and the reaction temperature was then raised to 45° F. over a 15-minute interval. The resulting product was processed as described in the preceding example. The dry product was found to have a sulfur content of 6.2%, a viscosity in 10% solution in distilled water at 25° C. of 44,088 centipoises and in 5% solution in distilled water of 831 centipoises.

*Example 3.*—2.5 parts of cotton linters were given a one hour boil in distilled water and centrifuged as dry as possible. The wet linters were covered with anhydrous toluol and the toluol-water azeotrope was removed by distillation until the linters were free from water and wet with 22.5 parts of dry toluol. 23.4 parts of concentrated sulfuric acid and 22.5 parts of toluol were placed in a turbo mixer and cooled to 60° F. There was stirred into this mass a mixture of 6.6 parts of isopropanol and .37 part of ammonium sulfate at such a rate that the temperature of the mixture stayed below 60° F. The mixture was cooled to 35° F., and the activated cellulose consisting of 2.5 parts of linters and 22.5 parts of toluol were added. The temperature of the reaction was allowed to rise to 45° F. over ¾ of an hour. The product obtained was processed as outlined in Example 1. The final product was found to have a sulfur content of 8.6% and a viscosity of 10% solution in distilled water of 3993 centipoises.

*Example 4.*—Wood pulp was activated as described in Example 1. There was added to a turbo mixer 2340 parts of anhydrous ethylene chloride and 1217 parts of concentrated sulfuric acid, and the mass was cooled to 60° F. Upon continued mixing there was then added 263 parts of isopropanol and 20 parts of ammonium sulfate, the temperature being held below 60° F. during this addition. The mixture was then cooled to 45° F. and 210 parts of the activated pulp consisting of 130 parts of pulp and 80 parts of isopropanol were added over a period of 10 minutes keeping the temperature below 45° F. The reaction mixture was then cooled to 38° F. This required 10 minutes and the temperature was then raised to 51° F. over a period of 35 minutes. The product was recovered in the manner described in Example 1. The dry product upon analysis was found to have a sulfur content of 7% and a viscosity in 5% solution in distilled water of 2243 centipoises.

*Example 5.*—Wood pulp was activated as described in Example 1. There was placed in a jacketed reaction vessel equipped with a Lightnin' propeller-type mixer 2340 parts of Stoddard solvent and 1217 parts of concentrated sulfuric acid. The mixture was cooled to 60° F. and 263 parts of isopropanol and 50 parts of ammonium sulfate were added thereto. The temperature of the mixture was held below 60° F. during the addition of the alcohol and then cooled to 38° F. 210 parts of the activated pulp consisting of 130 parts of pulp and 80 parts of isopropanol were added with continued mixing, the temperature was allowed to rise to 42° F. in 3 minutes and then to 51° F. over 42 minutes. The product was recovered in the manner described in Example 1. The dry product dissolved in a 10% concentration in distilled water.

We claim:

1. The process of preparing cellulose sulfate which comprises forming, and mixing cellulose therewith, at a temperature of 25–60° F. a bath comprising lower aliphatic alcohol of 2–5 carbon atoms, at least 50% of which is an alcohol of 3–5 carbon atoms, concentrated sulfuric acid, ammonium sulfate in an amount less than 25% of the bath and not more than 10% of water, the amount of sulfuric acid in the bath being at least sufficient to promote sulfation of the cellulose but less than will cause appreciable dissolving thereof in the liquid, the cellulose being present in the proportion of one part of cellulose to 12–60 parts of liquid, and the ratio of alcohol-sulfuric acid to cellulose in the mass being 4–30:1 and continuing to maintain the temperature at 25–60° F. until the cellulose has been converted to a cellulose sulfate.

2. A method of preparing cellulose sulfate which comprises forming, and mixing cellulose therewith, at a temperature of 25–60° F., a bath comprising isopropyl alcohol, concentrated sulfuric acid, ammonium sulfate in an amount less than 8% of the bath and not more than 10% of water, the isopropyl alcohol-sulfuric acid consisting of 15-25% of isopropyl alcohol and 85-75% of sulfuric acid, the cellulose being present in the proportion of one part of cellulose to 12-60 parts of liquid, and the ratio of alcohol-sulfuric acid to cellulose in the mass being 4-30:1, and continuing to maintain the temperature at 25-60° F. until the cellulose has been converted to a cellulose sulfate.

3. The process of preparing cellulose sulfate which comprises forming, and mixing cellulose therewith, at a temperature of 25-60° F., a bath comprising amyl alcohol, concentrated sulfuric acid, ammonium sulfate in an amount not more than 8%, and not less than 10% of water, the amyl alcohol-sulfuric acid mixture consisting of 55-65% of amyl alcohol and 45-35% of sulfuric acid, the cellulose being present in the proportion of one part of cellulose to 12-60 parts of liquid, and the ratio of alcohol-sulfuric acid to cellulose in the mass being 4-30:1 and continuing to maintain the temperature at 25-60° F. until the cellulose has been converted to a cellulose sulfate.

4. The process of preparing cellulose sulfate which comprises forming, and mixing cellulose therewith, at a temperature of 25-60° F., a bath comprising butyl alcohol, concentrated sulfuric acid, ammonium sulfate in an amount not more than 8% and not more than 10% of water, the butyl alcohol-sulfuric acid mixture consisting of 35-25% butyl alcohol and 65-75% of sulfuric acid, the cellulose being present in the proportion of one part of cellulose to 12-60 parts of liquid, and the ratio of alcohol-sulfuric acid to cellulose being 4-30:1 and continuing to maintain the temperature at 25-60° F. until the cellulose has been converted to a cellulose sulfate.

5. The process of preparing cellulose sulfate which comprises forming, and mixing cellulose therewith, at a temperature of 25-60° F., a bath comprising lower aliphatic alcohol of 2-5 carbon atoms, at least 50% of which is alcohol of 3-5 carbon atoms, concentrated sulfuric acid, an inert organic diluent, ½-8% of ammonium sulfate, and not more than 10% of water, the cellulose being present in the proportion of one part of cellulose to 12-60 parts of liquid, the ratio of alcohol-sulfuric acid to cellulose in the mass being 4-30:1 and the amount of sulfuric acid being at least sufficient to promote the reaction but less than will cause appreciable dissolving of the cellulose in the liquid, and continuing to maintain the temperature at 25-60° F. until the cellulose has been converted to a cellulose sulfate.

CARL J. MALM.
CARLTON L. CRANE.

REFERENCES CITED

The following references are of record in the file of this patent:

FOREIGN PATENTS

| Number | Country | Date |
|--------|---------|------|
| 217,168 | Great Britain | Jan. 9, 1925 |
| 377,795 | Great Britain | Aug. 4, 1932 |